April 4, 1967 W. R. EUBANK ET AL 3,312,922

SOLID STATE SWITCHING DEVICE

Filed June 22, 1965 3 Sheets-Sheet 1

INVENTORS
WILLIAM R. EUBANK
GEORGE A. WALKER
BY
Carpenter, Kinney & Coulter
ATTORNEYS INVENTORS
WILLIAM R. EUBANK
GEORGE A. WALKER
BY
Carpenter, Kinney & Coulter
ATTORNEYS INVENTORS
WILLIAM R. EUBANK
GEORGE A. WALKER
BY
Carpenter, Kinney & Coulter
ATTORNEYS United States Patent Office 3,312,922

Patented Apr. 4, 1967

3,312,922
SOLID STATE SWITCHING DEVICE

William R. Eubank, Troy Township, St. Croix County, Wis., and George Alexander Walker, White Bear Lake, Minn., assignors to Minnesota Mining and Manufacturing Company, St. Paul, Minn., a corporation of Delaware Filed June 22, 1965, Ser. No. 466,047
15 Claims. (Cl. 338—20)

This application is a continuation-in-part of our earlier filed application S.N. 376,482 filed June 19, 1964 now abandoned.

This invention relates to new and very useful glass compositions containing antimony, sulfur and iodine and in addition at least one of the elements copper, silver or gold. The invention further relates to new and very useful solid state semi-conductor devices using such glass compositions and to electrical circuits and methods for using such devices.

We have now discovered that certain glass compositions when suitably prepared into semi-conductor devices generally exhibit one or two of three distinct switching cycles responsive to appropriate electric field conditions, each cycle being distinctly different from the other and having its own characteristic voltage-current relationship. One switching cycle is characteristically non-polar but symmetrical; in this cycle switching occurs under applied voltage and current conditions. Each of the other switching cycles is characteristically sequentially polar and may or may not be symmetrical; in these cycles switching occurs to the low resistance state under nearly zero voltage and nearly zero amperage conditions.

The invention is described in the following specification taken together with the drawings wherein.

Figure 1:
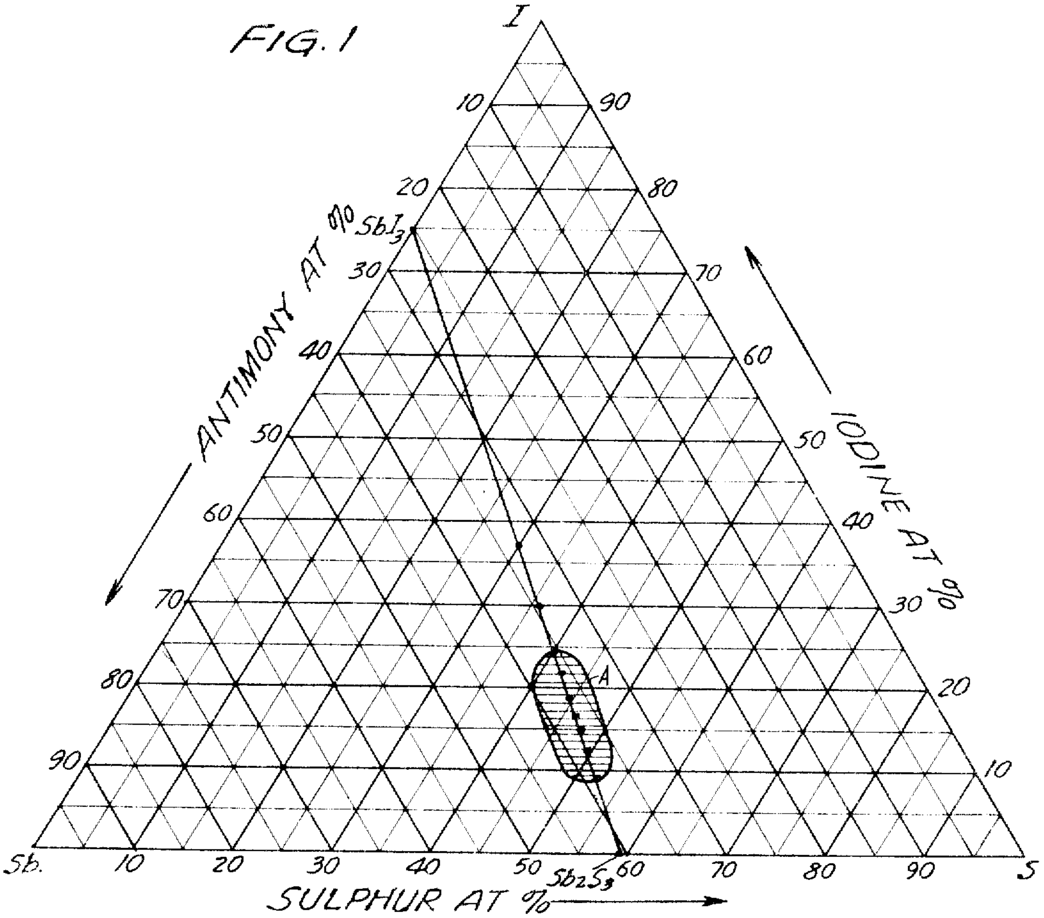
FIGURE 1 is a ternary diagram of the system antimony-sulfur-iodine showing glasses useful in devices of this invention.

In general, the starting materials employed to produce glasses of this invention either are the uncombined component elements or are compounds of two or more such elements. When using uncombined elements, it is generally preferable to employ each in a highly purified and finely divided form. However, largely because of the high volatility of iodine in elemental form, it is convenient and preferred to employ compounds of iodine in place of iodine itself; for example $SbI_3$.

Finely divided flowers of sulfur are found to be a convenient form of that element to use for making compositions. Granular or powdered analytical grade antimony, copper, silver and/or gold are preferably employed. The sulfur and antimony can be preferably prereacted in the ratio to form $Sb_2S_3$ before addition of the ternary component and subsequent formation of a glass, as described below.

In preparing a mixture of starting materials to produce a glass composition of this invention one simply mixes the predetermined selection of starting materials together in respective quantities (based on mole percent or atomic percent) such that the desired glass product will be produced.

In general, one can conveniently use two methods to prepare glass compositions of this invention. One method involves melting starting materials in a closed tube or remelting a glass formed in the closed tube, and the other involves melting starting materials in an open tube in order to deposit thin glass layers on a substrate.

The closed tube method for preparing glasses of this invention involves melting the starting materials within a suitable heat resistant sealed tube, as indicated.

The tube after sealing is then preferably suitably mounted for axial rotational movements in a hot zone maintained at a temperature of about 800° C. or higher. Each sealed tube is appropriately thus maintained in such hot zone for about ½ to 1 hour or until a homogeneous liquid melt is obtained. Thereafter, the tube and melt therein are removed from the hot zone and allowed to cool slowly. As before, if any crystallization is visually observed, the tube and contents are remelted and then rapidly cooled.

When melting in an open tube, one can employ heat resistant glass tubes and deposit in each tube a measured premixed quantity of individually weighed desired starting materials. Each such tube is then immersed into a hot zone maintained at a temperature of from about 600° C. to 700° C. with temperatures about 650° C. being preferred. Though times for the starting materials to melt and become homogeneous vary, they commonly range from about ½ to 1 hour, though longer or shorter times may be experienced depending on individual circumstances. Stirring helps promote homogeneity. After a homogeneous melt is obtained, the tube is removed from the hot zone and allowed to cool in air at room temperature. This cooling rate is generally slower than about 10° centigrade per second (10° C./sec.).

If one visually observes any crystallization in the melt as it thus slowly cools within the tube, such tube can be reinserted into the hot zone and the mixture remelted. Then when the hot tube and contents are removed from the hot zone, they are rapidly quenched, as by immersion into water at room temperature or the like, so as to rapidly cool such tube and contents at a rate greater than about 100° centigrade per second (100° C./sec.).

We prefer the sealed evacuated tube method for forming glasses of this invention since possible volatilization losses, and slight compositional changes during melting are thereby eliminated. Also higher temperatures, by about 100° C., may be employed allowing solution of certain more difficulty soluble components to take place more readily. For practical purposes such as application of thin layers of the glass on a substrate, however, it was necessary to employ the open tube method of melting. In many cases, glasses made and characterized by the closed tube method were remelted and obtained as thin layers by the open tube method.

For purposes of this invention in determining whether or not a cooled solid product is a glass (e.g. for establishing the glass composition of FIGURE 1 within the teachings of this invention), the following considerations are used:

(1) Presence of conchoidal fracture upon breaking of a sample.
(2) Substantially no birefringence (i.e., double refraction) when a sample is examined under a petrographic microscope (with a glass which is not too opaque for such an examination).
(3) Substantially no distinct lines indicative of crystal structure when a sample is examined by conventional X-ray powder diffraction techniques.
(4) Gradual softening and final remelting of a sample as its temperature is increased (in contrast to the sharp melting points characteristically observed in the case of crystallized materials).
(5) Forming a long continuous (e.g. 2.5 feet (about ¾ meter) or longer) fiber from a sample of molten material as by pulling or suddenly extending in air a sample molten material smaller than about ½ gram before such sample solidifies.

By the use of the foregoing methods and considerations, the ternary glass phase diagram of FIGURE 1 is prepared.

The ternary glass compositions defined by FIGURE 1 are described in copending U.S. application S.N. 376,484 filed June 19, 1964. It is this ternary system which forms the basis for glasses of this invention which are produced by replacing a portion of the antimony in such compositions by predetermined or preselected respective quantities of copper, silver and/or gold. While usually one will generally prefer to substitute only one of the elements copper, silver or gold for a portion of the antimony, it will be appreciated that two or even three of these elements can be substituted for a portion of the antimony. The examples given in Table I below illustrate typical glass compositions of this invention.

Electrical properties of each glass example are also illustrated in Table I, however, for purposes of clarity in presentation, explanation of electrical properties is postponed until a description of such properties is given below.

Specifically, the glass compositions of the examples in Table I were prepared by using both the closed tube and the open tube methods above described. The closed tube technique was used to evaluate the glass forming characteristics of each composition, then each composition was thereafter remelted in an open tube and thin layers deposited on an aluminum strip by dipping. In each example, the procedure followed was to deposit from about 25 to 50 grams of carefully premixed starting materials in the bottom of a refractory glass test tube. Each tube was then evacuated as with a mechanical rotary vacuum pump to a pressure less than about 10 torr (one torr is equivalent to a pressure of 1 millimeter of mercury, 1/760 atmosphere). Thereafter, each tube was sealed with an oxygen-gas torch, and deposited in an iron pipe adapted to be axially rotated in a tube furnace. Such pipe was then mounted in the tube furnace. Each sample was then maintained in the furnace at a temperature of about 800° C. for about ¾ of an hour, after which the pipe was removed from the furnace and slow cooled. As described above in the event crystals are formed, the tube is reheated to remelt the contents and then the tube and contents are quenched by immersion into room temperature water (about 20° C.). After breaking the glass tube and separating the sample, the sample is deposited in an open tube and remelted at a temperature somewhat above 600° C. and an aluminum strip immersed into the melt so as to provide a layer preferably approximately 1 mil (about 0.025 mm.) thick on the aluminum. Conveniently such aluminum strip has one surface previously carefully cleaned and is 16 mils (0.4 mm.) in thickness and ½ inch (1.27 cm.) wide and 6 to 8 inches (15.25 cm. to 20.32 cm.) long. If the molten glass on the aluminum strip devitrified on cooling, the sample was considered inoperative for purposes of this invention. After dipping and cooling, each so-coated aluminum strip is inserted into a sand blasting unit, such as an S. S. White dental abrader, and a glass layer on one side of the aluminum strip completely removed so that subsequent electrical contact can be made with the so-cleaned aluminum surface. Thereafter, the electrical measurements shown were made on the thin layers of glass, as further described hereinafter, when electrical properties of devices of this invention are described.

As an alternative procedure, one can cast, mold or otherwise form self-supporting layers of glass without the benefit or use of an aluminum or other substrate. Such layers can range up to ¼ inch (about 0.5 cm.) or even thicker. These thicker layers may be switched in accordance with this invention especially when one uses glasses exhibiting lower initial resistance, as for example the glass compositions 8 and 9 of Table I below.

It will be appreciated that, as used herein the term "glass layer" or "glass wafer," etc., has reference to any convenient geometric form, such as wafers, beads, etc.

Preferably a glass layer which is to be switched in accordance with this invention is annealed to remove possible strains therein before being subjected to an electric field for activation. For example, a glass can be annealed by heating to from 80 to 120° C. for 10 to 45 minutes under atmospheric conditions.

Also preferably, surface portions of a glass layer which is to be switched are removed by abrading. For example, as a rule-of-practice, one can remove about 5 percent of the total layer thickness.

TABLE I.—GLASSES AND PROPERTIES THEREOF

[English System]

| Composition of Substituted Glass (Atomic Percent) | | | | | | Electrical and Switching Properties | | | | | |
|---|---|---|---|---|---|---|---|---|---|---|---|
| | | | | | | Resistance, 1 mil Glass Layer (ohms) | | | Field (volts per mil) Required For— | | |
| Example No. | Sb | S | I (constant) | Other metal | Other chalcogen | Initial | High | Low | Induced Conduction | Downswitch [a] | Upswitch [b] |
| 1 | 22.6 | 38.4 | 15 | 24 Cu | | [c] 200 | $2\times10^5$ | 200 | None Reqd. | 10 | 3 |
| 2 | 22.6 | 26.4 | 15 | 24 Cu | 12 Te | [c] 100 | $1.3\times10^5$ | 100 | None Reqd. | 3 | 10 |
| 3 | 35 | 46.7 | 15 | 3.3 Ag | | $2\times10^{11}$ | $2\times10^{10}$ | 1,000 | 250 | 130 | 43 |
| 4 | 33 | 45 | 15 | 6.7 Ag | | $3\times10^{10}$ | $2\times10^9$ | 500 | 120 | 60 | 25 |
| 5 | 31 | 44 | 15 | 10 Ag | | $5\times10^8$ | $5.6\times10^6$ | 400 | 110 | 45 | 2 |
| 6 | 29 | 42.7 | 15 | 13.3 Ag | | $2\times10^6$ | $3\times10^4$ | 100 | 100 | 22 | 1.5 |
| 7 | 25 | 40 | 15 | 20 Ag | | $1\times10^4$ | $2\times10^3$ | 100 | 100 | 23 | 0.9 |
| 8 | 22.6 | 38.4 | 15 | 24 Ag | | $1\times10^4$ | $2\times10^3$ | 150 | 45 | 12 | 1.2 |
| 9 | 22.6 | 26.4 | 15 | 24 Ag | 12 Te | $1\times10^3$ | $3\times10^2$ | 30 | 20 | 5 | 0.4 |
| 10 | 35 | 46.7 | 15 | 3.3 Au | | $4.8\times10^{12}$ | $2.6\times10^{11}$ | 550 | 500 | 200 | 1.8 |

[a] "Downswitch" has reference to the change which occurs in a glass when it switches from a high resistance state to a low resistance state in response to an applied electric field.
[b] "Upswitch" has reference to the change which occurs in a glass when it switches from a low resistance state to a high resistance state in response to an applied electric field.
[c] In low resistance state as prepared but capable of being switched to a high resistance state.

The glass compositions of this invention useful in the switching devices of this invention comprise the ternary system defined by the glass forming region outlined in FIGURE 1 wherein a portion of the antimony is replaced by at least one of the elements in the following Table II within the maximum and minimum atomic percents indicated therewith for each respective element.

TABLE II

| Element | Minimum Atomic Percent | Maximum Atomic Percent |
|---|---|---|
| Cu | Greater than 0 | 24 |
| Ag | do | 24 |
| Au | do | 5 |

In general, compositions of the invention contain not less than about 15 atomic percent of antimony, independently of the amount of copper, silver and/or gold which is used to partially replace the antimony in the ternary system defined by the glass forming region outlined in FIGURE 1, as is above mentioned.

In general, all of the glass compositions in this invention as above described are useful in the manufacture of semi-conductor switching devices.

A switching device of this invention utilizes a wafer of a glass of this invention as defined in Table I such as one having a composition as described by the shaded area A of FIGURE 1 in which the antimony is partially replaced by one or more of the respective elements indicated in Table II above. Such a wafer can have any convenient form. One preferred form is to deposit a thin layer of glass composition uniformly upon a metal substrate, especially aluminum. Another method is to lap down a solid mass of glass composition to a desired thinness, though this method is limited by the thinness of the layer which can be readily produced.

Conveniently and in general, such wafer is in the form of a thin film envelope having a front face and a back face. Each such respective face is commonly separated natively, the lead wires may be embedded in the glasses by insertion prior to glass layer solidification.

When, of course, the wafer is deposited upon a thin metal substrate or other conductive substrate, such substrate then forms one electrode. Suitable leads are connected to the electrodes to connect the switching device into a circuit. It will be appreciated that more than two electrodes can be secured to a single wafer construction. The relationship between a wafer and each pair of electrodes functionally associated therewith is such that the wafer has a characteristic initial resistance state measured through such electrodes greater than the characteristic high resistance state. The relationship is also such that when a sufficient minimum electric field is applied to such wafer through such electrodes, such wafer becomes semiconductive as indicated by a change or drop from the characteristic initial resistance state to a characteristic low resistance state, when a 50-kilohm series resistance controls the current to the device.

The devices herein described have in addition a fourth characteristic resistance state. This state only occurs when a device of the invention is in a sequentially polar condition. This fourth state is intermediate between the high and low resistance states. It is characterized by the fact that no series resistance is needed when a device switches from this state to the characteristics low resistance state. We shall call this high resistance state an intermediate resistance state for convenience. Values of two intermediate resistance states are:

(a) $2\times10^2$ ohms/0.001 inch ($8\times10^3$ ohms/mm.).

(b) $1\times10^4$ ohms/0.001 inch ($4\times10^5$ ohms/mm.)

for glass compositions containing:

about 13.3 atomic percent silver or copper,
about 29.0 atomic percent antimony,
about 42.7 atomic percent sulfur, and
about 15.0 atomic percent iodine.

The following Table III presents in tabular form the respective values of initial, high, intermediate and low resistance ranges of activated glasses containing copper, silver or gold:

TABLE III.—TYPICAL RESISTANCE RANGES

[English System]

| Element Substituted For Antimony | Atomic Percent, Replaced Range | Resistance Range (ohms/0.001 inch) | | | |
|---|---|---|---|---|---|
| | | Initial | High | Low | Intermediate |
| Copper | 6–13.3 | $9\times10^{10}$–$2\times10^{10}$ | $2.5\times10^{10}$–$5\times10^{9}$ | $2.5\times10^{2}$–$2\times10^{2}$ | $2.8\times10^{8}$–$1\times10^{4}$. |
| Silver | 3–13.3 | $1.7\times10^{11}$–$1.7\times10^{6}$ | $2.5\times10^{10}$–$3\times10^{4}$ | $6\times10^{2}$–75 | $1.5\times10^{7}$–$2\times10^{2}$. |
| Gold | 2.5–5 | $5\times10^{12}$–$8\times10^{11}$ | $2.5\times10^{11}$–$5\times10^{10}$ | $2.5\times10^{2}$–$3\times10^{2}$ | $2.2\times10^{9}$–$4\times10^{2}$. |

from the other by an average glass thickness of from about 0.5 to 18 mils (about 12.5 microns to 0.45 mm.), such thickness depending upon the characteristics, shape, etc., desired in a given device. The cross-sectional area of each such face is substantially greater than the glass thickness. Other forms of wafer constructions can also be employed, as those skilled in the art will readily appreciate.

Two electrodes are functionally associated with the wafer, each one with a different surface region thereof. In the case of thin layers, it is convenient to position one electrode on one face of the glass wafer and the other on the opposite face although any suitable arrangement can be used including adjacent positioning of electrodes on a common face. The electrodes can be functionally associated with the wafer in any given way as by employing spring-loaded pointed metal such as tungsten contacts. In other cases the electrode on the glass surface may be formed from air drying silver paste. If desired, suitable lead wires of a conductor such as copper or aluminum may be soldered to the silver spot employing Woods metal (e.g. 50 weight percent bismuth, 25 weight percent lead, 12.5 weight percent tin, and 12.5 weight percent cadmium) or other low melting solder. Alter- The initial resistance state, the high resistance state, the low resistance state and the intermediate resistance state are usually quite constant for a given device. Such resistance states, for purposes of this invention, are conveniently measured in terms of ohms per mil (or mm.) of shortest distance between a pair of electrodes used for making such measurements.

When a switching device is first constructed, it is essentially nonconductive, however, as indicated above, it becomes conductive when a sufficient minimum electric field is applied to the wafer plus a series resistor through a pair of electrodes whose space is usually, though not necessarily, in the range of from about 0.5 to 18 mils about 12.5 microns to 0.45 mm.). In series with such device is the resistor typically, though not necessarily, one having a value of about 50 kilohms, the exact choice of this resistance being variable depending upon the particular use situation involved. To render such device semi-conductive, electric fields in the range of from about 10 to $10^3$ volts per mil (about $4\times10^2$ to $4\times10^4$ volts/mm.) are commonly used although it will be appreciated that values greater or lower than this can be employed depending upon individual circumstances. This minimum field can be in the form of short bursts or pulses of electric potential. As soon as a device becomes semi-conductive, such change can be detected readily by a drop from the characteristic initial resistance state to a lower resistance state which is the characteristic low resistance state for that device.

One such device is in its characteristic low resistance state, the 50-kilohm series resistor is removed and an appropriate upswitch electric field pulse is applied to same, when the device switches to its high resistance state. Usually, upswitch electric field pulses fail in the range of from about 0.8 to 20 volts though potential values above and below this range can be employed depending upon individual circumstances. The minimum pulse duration in terms of time necessary to obtain upswitching similarly varies but is commonly of the order of microseconds.

Once such a device is switched from its low resistance state it assumes its characteristic high resistance state as indicated, but then becomes susceptible to downswitching or returning to its characteristic low resistance state when the 50-kilohm resistor is inserted and a suitable electric pulse applied. For downswitching, suitable electric field pulses range from about 8 to 500 volts of time duration from about 1 microsecond though values greater or smaller than this, of course, may be necessary in individual circumstances.

Usually, there does not appear to be any determinable limit upon the number of times a device may switch from its high resistance state to its low resistance state. Observe that the high resistance state is always lower than the initial resistance state.

Figure 6:
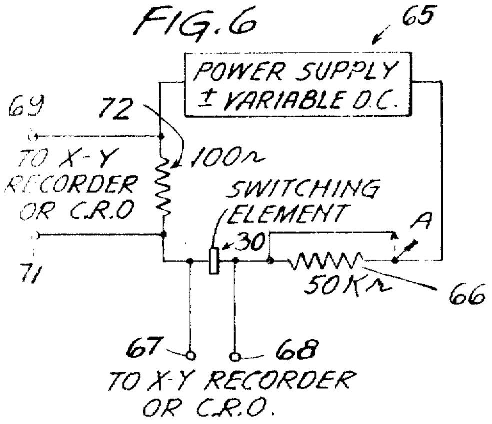
FIGURE 6 is a circuit diagram of the electrical circuit suitable for activating and making electrical measurements upon a device of this invention.
Figure 7:
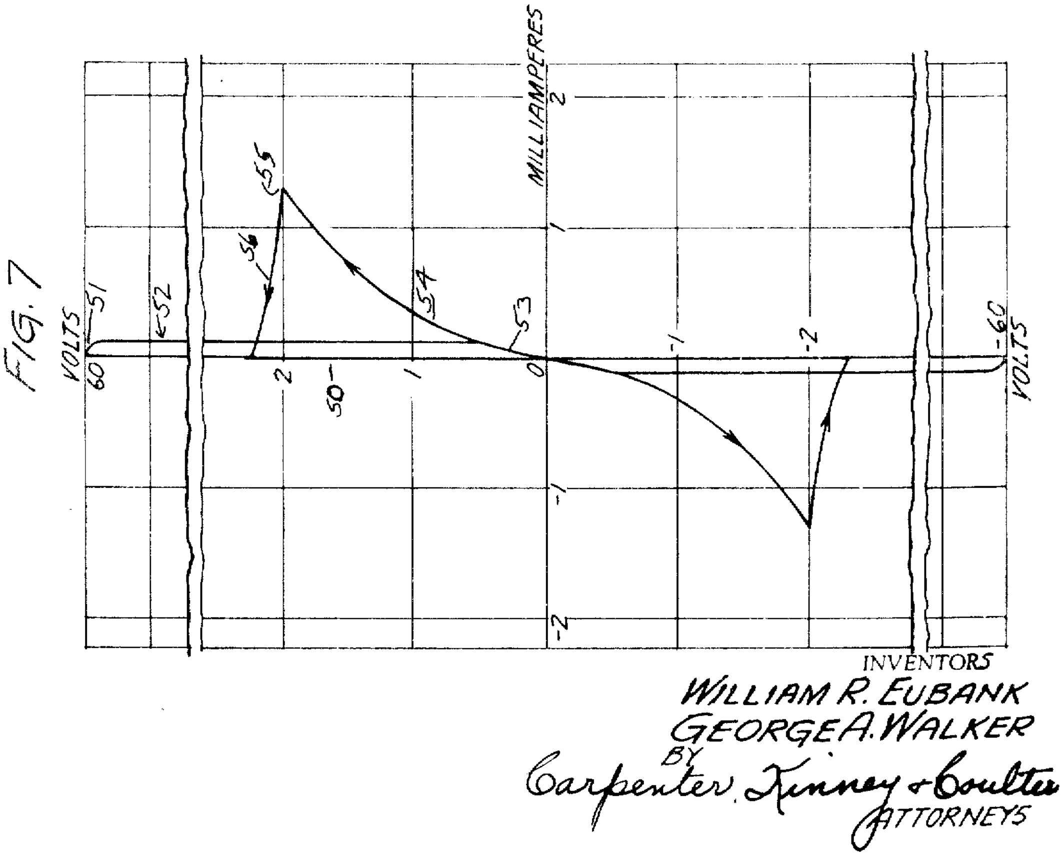
FIGURE 7 is a voltage-current plot showing the characteristic wave form associated with the symmetrical non-polar switching cycle of a device of this invention.

FIGURE 6 represents one specific embodiment of a circuit useful for switching a device 30 to produce a switching curve such as shown in FIGURE 7. The circuit consists of a 1000-volt, 500-milliampere direct current power supply 65, a 50-kilohm series resistor 66, switch A1 and the device 30. Voltage current characteristics are observed using the pairs of terminals 67, 68 and 69, 71 which can be connected, for example, to an $x$–$y$ recorder or a cathode ray oscilloscope. A 100-ohm resistor 72 is used for current sampling. For activation of device 30 from its initial resistance state, a switch A1 is opened, thereby placing 50-kilohm resistor 66 in series with device 30, and a positive or a negative electric field is gradually applied to device 30. When a critical voltage is reached (dependent on composition and construction of device 30) the initial resistance drops sharply to a stable low resistance state.

FIGURE 7 shows a typical voltage-current characteristic symmetrical switching curve for a device made from a glass composition as described in row 1, Table V below. To understand this curve, a series resistance, such as a 50-kilohm resistor is placed in the circuit to control current and act as a voltage divider. Assume such a device to be in its high resistance state and that a positive electric field is to be applied thereto. The voltage is gradually increased from the origin with little flow of current along the curve 50. At some critical voltage, say 60 volts at point 51 in the illustration of the figure, such device begins to pass current, as shown by the curve 52, and switches rapidly to its low resistance state at point 53.

Next, voltage is reduced to zero along the low resistance curve 54 and the said series resistance is removed from the circuit. Voltage is again increased positively across such device and the low resistance curve 54 results. The voltage-current plot then follows the characteristic low resistance curve 54 to a valve 55. The device now again switches to its high resistance state along the negative resistance curve 56 back to high resistance curve 50. This cycle can be repeated indefinitely with either positive or negative voltages. Negative voltages are also illustrated in FIGURE 7. Thus activation can be achieved by either a positive or a negative voltage, and upswitching or downswitching can be achieved following activation by either or both separately and sequentially applied positive or negative voltages. Such use of positive and negative voltages thus produces a symmetrical voltage-current plot.

Figure 8:
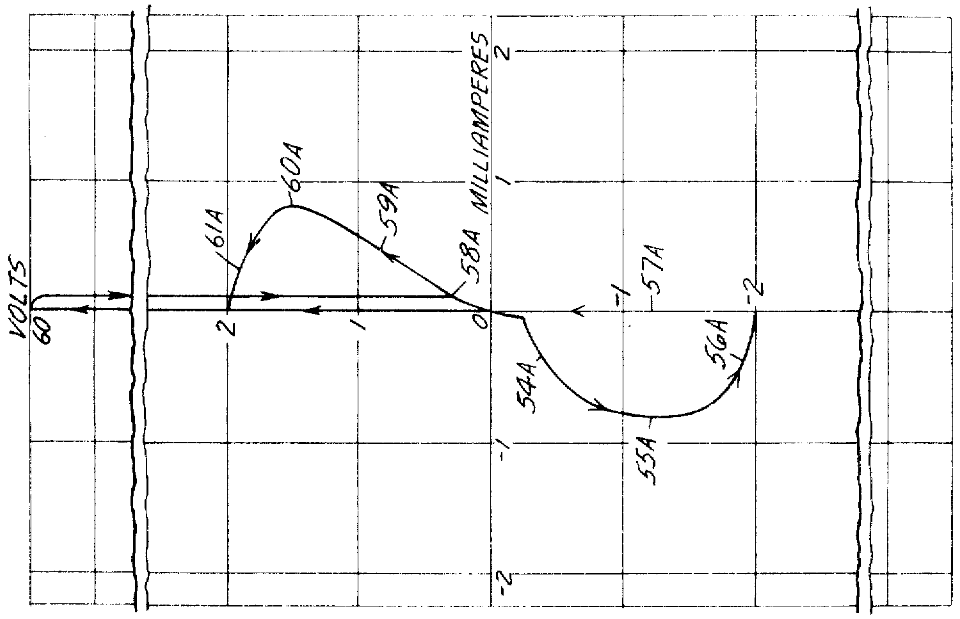
FIGURE 8 is a voltage-current plot showing the characteristic wave form associated with a sequentially polar symmetrical switching cycle of a device of this invention.

As indicated above, some semi-conductor devices of this invention are capable of exhibiting sequentially polar switching to the low resistance state under nearly zero voltage and nearly zero amperage conditions. Such switching sequence is illustrated by the typical voltage-current characteristic curve of FIGURE 8 where there is shown the electrical behavior of one embodiment of a sequentially polar symmetrical switching device employing a substituted glass containing relatively low percentages (e.g. see row 2.1 of Table V below) of copper, silver or gold. Assuming such switching device to be activated as previously described in FIGURE 7 and with such device in its characteristic low resistance state, switch A1 in FIGURE 6 is closed (i.e. the 50-kilohm resistance is removed from the circuit). The voltage across the device is gradually increased in a negative direction, relative to the activation voltage and curve 54A results. At some critical voltage 55A (dependent on construction and composition) the device switches at about a point 56A to its intermediate resistance state. When the voltage across the device is thereafter first decreased to zero along the high resistance curve 57A and is then increased with opposite polarity, the device is found to switch to its characteristic low resistance state again. The slope initially follows a high resistance curve 58A (of the same order of magnitude as the high resistance state) until at some very low voltage the slope begins to follow the low resistance curve 59A. At some critical point 60A the device again upswitches to its characteristic high resistance state. This cycle can be repeated indefinitely and can be cycled with a pulse generator. The device can be driven to the symmetrical switching cycle by increasing the voltage after upswitch to some critical voltage (for substituted Ag, see Table VI) when the sample reverts back to its high resistance.

For intermediate percentages (see row 2.2 Table V below) of substituted Cu, Ag and Au, a switching device made from such a substituted glass is activated as previously described, so that the element is in its characteristic low resistance state and switch A1 in FIGURE 6 is closed. FIGURE 8 again applies to this device but, contrary to the situation with the device just above described, the initial upswitch can either be of positive or negative voltage relative to the activation voltage. Now this device can be driven to the symmetrical switching cycles, illustrated in FIGURE 7, by increasing the voltage after upswitch to some critical voltage (generally larger than about 10 volts, see Table VI), after which the device reverts back to its characteristic high resistance state.

For high percentages (see row 3, Table V below) of substituted Cu, Ag and Au, a switching device made from such a substituted glass is activated as previously described. This switching device exhibits sequentially polar non-symmetrical switching behavior. With such device in the low resistance state, switch A1 in FIGURE 6 is permanently closed.

Figure 9:
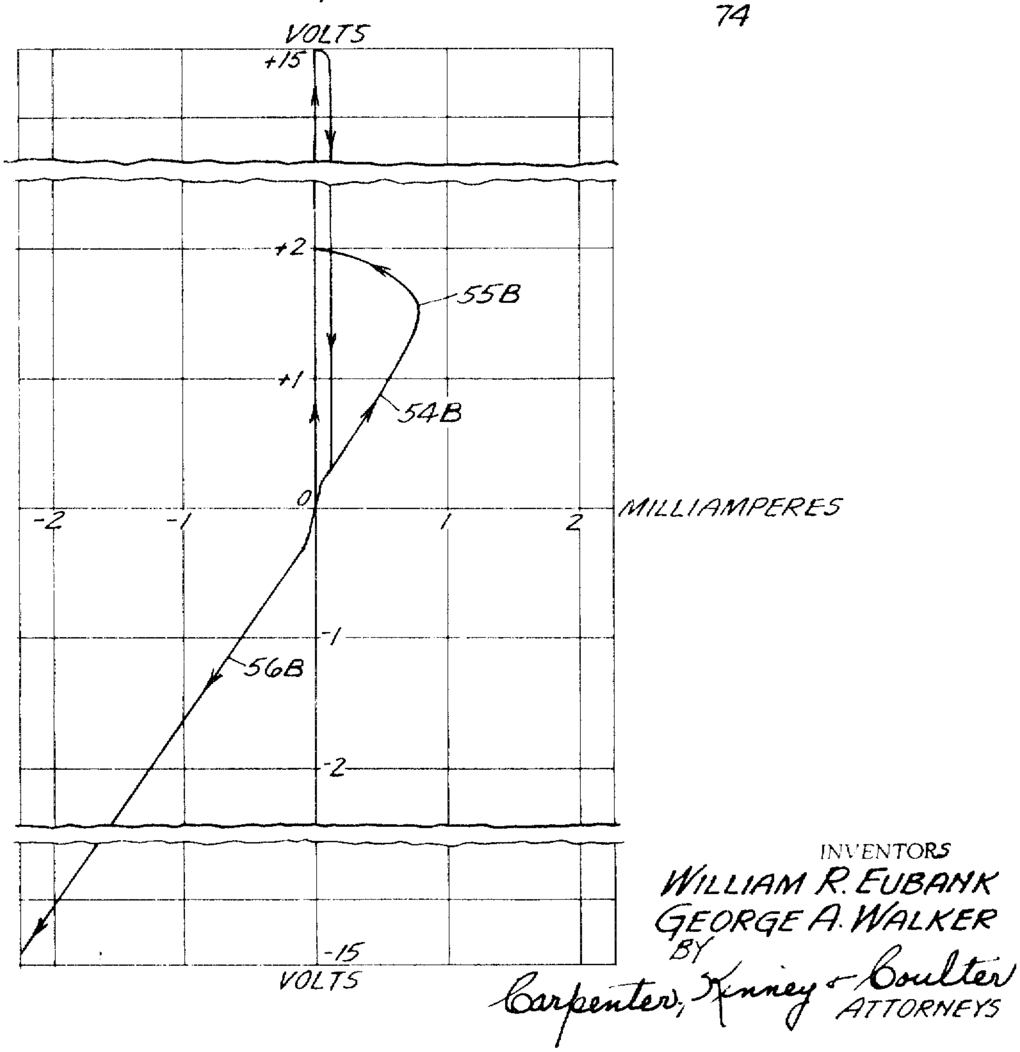
FIGURE 9 is a voltage-current plot showing the characteristic wave form associated with a sequentially polar non-symmetrical switching cycle of a device of this invention.

FIGURE 9 shows a typical voltage-current characteristic curve for such device. If the voltage across the device is increased with the same polarity as the activation voltage, the low resistance curve 54B results and upswitch occurs at some critical voltage 55B. If the voltage is now increased with the opposite polarity 56B, then the device is found to change to a low resistance state from which it cannot be upswitched with this polarity. As a result, when voltage is increased in this direction, burnout occurs at some critical voltage (about 50 volts). However, if before burnout, the voltage is decreased to zero along 56B and then increased in the opposite direction along 54B (i.e. polarity is again the same as the activation voltage), the device is found to be still in a low resistance state. At some critical voltage 55B, the device again upswitches. This cycle can be repeated indefinitely. Observe that it is not possible to drive this switching device to the normal symmetrical switching cycle An important characteristic for switching devices having sequentially polar non-symmetrical switching behavior is illustrated by reference to FIGURE 9. Using these devices, the upswitch voltage required for switching can be conditioned by a preliminary process step. In this preliminary step, an electric field having a polarity opposite from that to be subsequently used for effecting switching is applied to, and then removed from such a device (for example, conveniently an electric field such as a voltage pulse). It is then found that, when the so conditioned device is subjected to an electric field for switching, there exists a direct proportionality between the magnitude of such applied electric field and the magnitude of the applied electric field of opposite polarity, used in the preliminary step. Thus, in effect the device remembers to switch corresponding to its conditioning and the switching point (voltage) can be preset over a wide range. This unexpected and highly unusual behavior can be used in a wide variety of memory functions especially in those of higher order than the conventional binary (on-off) system.

Table IV below illustrates the dependence of upswitch voltage on conditioning voltage applied with opposite polarity. The values given are those for a device of the invention using as a glass wafer a glass containing 24 atomic percent silver for a 24 atomic percent Ag glass. The circuit shown in FIGURE 6 is used for measuring these values with switch A1 permanently closed.

TABLE IV

| Conditioning Voltage Applied (Opposite Polarity) with Non-Upswitch Polarity (Volts) | Corresponding Upswitch Voltage Required (Volts) |
|---|---|
| 1.0 | 1.2 |
| 2.0 | 2.3 |
| 3.0 | 3.3 |
| 4.0 | 4.3 |
| 5.0 | 5.3 |
| 6.0 | 6.3 |
| 7.0 | 7.1 |
| 8.0 | 8.2 |
| 9.0 | 9.2 |
| 10.0 | 10.2 |

In the following Table V there appears in tabular form an indication of the relative amounts of silver, gold and copper respectively, which are necessary in a given device of this invention in order to produce, as desired, (1) non-polar symmetrical switching, (2) symmetrical sequentially polar switching, or (3) non-symmetrical sequentially polar switching. The overlap between ranges indicated in rows 1 and 2, Table V, show that the same glass composition can have two different switching characteristics.

TABLE V

| Switching Type | Amount of Material Substituted for Sb (Atomic Percent) [1] | | | Comments |
|---|---|---|---|---|
| | Cu | Ag | Au | |
| 1. Non-polar, symmetrical | 0–22 | 0–16 | 0–5 | Au—non-glass above 5%. |
| 2. Sequentially polar: | | | | |
| Symmetrical | 6–22 | 3–16 | 2.5–5 | |
| 2.1 | [1] 6–8 | [1] 3–7 | [1] 2.5–4 | |
| 2.2 | 8–22 | 7–16 | 4–5 | |
| 3. Sequentially polar, non-symmetrical. | 22–24 | 16–24 | None | |

[1] These ranges are approximate; sometimes overlapping of ranges occurs.

In general, the electrical characteristics of a device of this invention necessary to upswitch such a device from an intermediate resistance state to a high resistance state are summarized for glasses containing silver by the following Table VI.

TABLE VI

| Compositional Range (Atomic Percent Ag) | Upswitch requirement of sample from Intermediate resistance state to High resistance state |
|---|---|
| 3–16 | 10 volts–40 volts. |
| 16–24 | Cannot Upswitch. |

Figure 2:
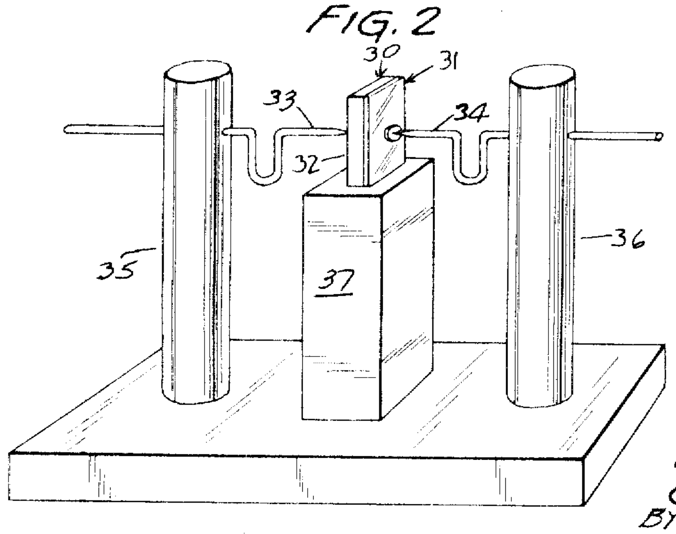
FIGURE 2 shows one embodiment of a semi-conductor switch construction using a glass composition of this invention.

One embodiment of this invention in the form of a switching element mounted for electrical and switching tests is illustrated in FIGURE 2. The switching element 30 comprises of, for example, a one-mil (about 0.025 mm.) layer 31 of glass of example No. 1, Table I, on an aluminum substrate 32, is positioned on a support 37 between a pointed tungsten electrode 33 which contacts the aluminum backing and a pointed tungsten electrode 34 which contacts the glass layer 31. The tungsten electrodes are conveniently made of 50-mil (about 1.25 mm.) wires having U-shaped bends as illustrated, so as to facilitate spring loading or application of pressure at their points of contact with the switching element. One end of each tungsten electrode is held rigidly by supports 35 and 36, respectively, which serve also as convenient connection points for batteries, pulse generators, meters and other circuit components used to evaluate the properties of semiconductors.

Figure 3:
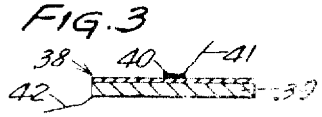
FIGURE 3 is a vertical sectional view taken across the central portion of another embodiment of a semi-conductor switch construction of the invention.
Figure 4:
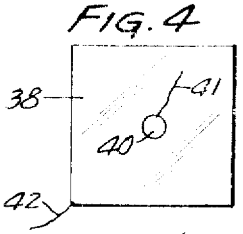
FIGURE 4 is a top plan view of the device of FIGURE 3.

Another embodiment of a device of this invention is shown in FIGURES 3 and 4. In these figures, the switching element comprising a glassy layer 38 on an aluminum substrate 39 has fixed lead wires 41 and 42, respectively. Lead wire 41 is attached to the glass surface by soldering to a spot 40 of air drying silver paste using Woods metal or other low melting solder. Lead wire 42 is conveniently attached to the aluminum substrate by spot welding or other suitable means of joining metals to aluminum.

Figure 5:
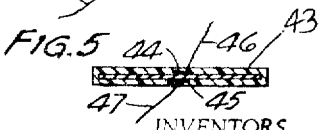
FIGURE 5 is a view similar to FIGURE 3 but showing a modified form of such construction.

Still another embodiment of a device of this invention is shown in FIGURE 5 in which a wafer 43 of semi-conducting glass does not require the support of a metal substrate and because of its relatively low initial resistance can be employed in substantially thicker sizes. Since the initial resistance of the glass is several orders of magnitude lower than that of the previous examples, layers as thick as 20 mils (about 0.5 mm.) can be employed. These thicker wafers can be prepared by conventional transistor dicing and lapping techniques. Leads 46 and 47 are attached to the glass wafer 43 of FIGURE 5 by application of air drying silver spots 44 and 45 and soldering with a low melting solder, such as a Woods metal as previously described.

In general, whether point contact or area contact is made between electrodes and a glass wafer (sometimes called glassy layer or the like for convenience), one achieves the characteristic symmetrical and sequentially polar switching capabilities associated with the semi-conductor device of this invention.

Figure 10:
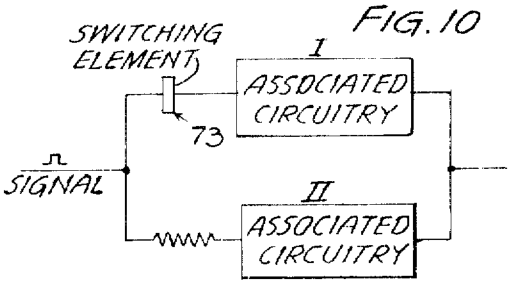
FIGURE 10 shows one embodiment of a schematic circuit diagram using a device of this invention.

FIGURE 10 shows one embodiment of a schematic circuit diagram using a device of this invention. The device 73 is initially in a high resistance state for positive pulses. The branch of the circuit marked II would therefore accept the positive pulses or direct current voltage. When a negative pulse appears across the input, then the switching device delivers a pulse to branch I of the circuit. This pulse can be counted or can be used to trigger a bubble chamber, say, when used in conjunction with a coincidence arrangement of detectors. The next positive pulse (or a bias voltage) would return the switching device to its high resistance state in the positive direction allowing branch II to function again.

Figure 11:
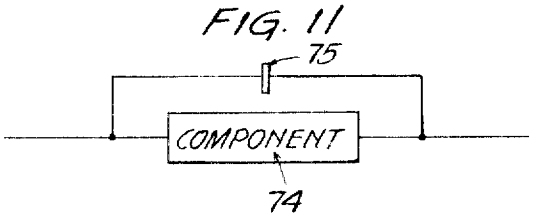
FIGURE 11 shows another embodiment of a schematic circuit diagram using a device of this invention.

FIGURE 11 shows the switching element as it might be used as a non-destructive protection device. The component 74 shown is susceptible to (i.e. would be damaged by) a negative voltage. The switching element 75 is in a high resistance state for positive voltage. If a negative surge voltage appeared across component 74, then the element 75 would switch to a low resistance state protecting the component 74. When the positive voltage again appeared the element would switch back to a high resistance state. Switching elements with high conentrations of Ag or Cu are particularly amenable to this application.

The sequentially polar non-symmetrical switching device is admirably suited for a memory element with either destructive or non-destructive readout. For example, in such an application, a device would normally be initially in a high resistance state. Positive input pulses would leave the device in a high resistance state, and negative pulses would switch the device to a low resistance state. Hence, in a binary system, interrogation is accomplished by means of small positive pulses or large positive pulses. Small positive pulses (less than 2 volts) show the device to be in a low or high resistance state without destroying the memory. A large positive pulse (greater than 2 volts) switches all low resistance devices in a circuit to high resistance states and hence destroys the memory. Selective destruction can also be carried out. Interrogation, alternatively, can be carried out by positive or negative pulses if so desired but this is non-destructive. The system can be left permanently in a memory state since any change in input automatically destroys the previous memory.

By the term "symmetrical switching" as used in this application, reference is made to a characteristic transition from high to low resistance states (and vice versa) by means of an applied polarity independent electric field. This effect is characterized by the fact that a series resistance is required for conversion from the high to the low resistance state.

By the term "sequentially polar symmetrical switching" as used in this application, reference is made to a characteristic transition from an intermediate resistance state to a low resistance state by means of a voltage of very small magnitude, and of opposite polarity to that voltage which was required to put a device into the aforesaid intermediate resistance state from a previous low resistance state. Such switching is further characterized by the fact that a device can be switched from the sequentially polar symmetrical switching state to a "symmetrical switching" state (described above) by applying an overvoltage when the device is in an intermediate resistance state.

By the term "sequentially polar non-symmetrical switching" as used in this application, reference is made to a characteristic transition from an intermediate to a low resistance state by means of a voltage of very small magnitude of opposite polarity to that voltage required to put a device into the aforesaid intermediate resistance state from a previous low resistance state. Such switching is further characterized by the fact that it cannot be switched from a low resistance state to an intermediate resistance state with a voltage of opposite polarity as compared to the original activation voltage; hence, switching is non-symmetrical. Such switching is further characterized by the fact that a device cannot be switched from the sequentially polar, non-symmetrical switching state to a symmetrical switching state.

For summary purposes, switching an activated sequentially polar symmetrical switching device of this invention begins with such device in its characteristic low resistance state. One applies a first electric field across said device sufficient to cause same to switch to its intermediate resistance state. One reduces said first electric field to zero and applies a second electric field of opposite polarity from said first electric field sufficient to cause such device to switch to its characteristic low resistance state.

On the other hand, when one switches an activated sequentially polar non-symmetrical switching device of this invention, one begins with such device in its characteristic low resistance state, as activated. Then one applies a first electric field across said device sufficient to cause same to switch to its intermediate resistance state, said first electric field having the same polarity as that electric field used to activate such device. Next one reduces said first electric field to zero and applies a second electric field of opposite polarity from said first electric field sufficient to cause such device to switch to its characteristic low resistance state. At this point one has the option of doing either one of two things. First, one can increase the intensity of said second electric field until a maximum field energy is reached at which breakdown occurs and the device becomes inoperable. Alternatively, one can reduce said second electric field to zero after said device has switched to its characteristic low resistance state and before breakdown is reached and then apply said first electric field across said device until such device switches to its characteristic intermediate resistance state.

Finally, to switch an activated sequentially polar symmetrical switching device from its characteristic intermediate resistance state to its symmetrical high resistance state one applies an electric field (greater than 10 volts) across said device sufficient to cause same to switch from its intermediate resistance state to its symmetrical high resistance state, said electric field having a polarity the same as that of the electric field used to activate said device.

The following Table VII summarizes ranges of activation voltages, downswitch voltages, and upswitch voltages for various glasses of this invention when prepared into devices as aforedescribed and used. In certain instances these ranges overlap. Owing to individual fluctuations and operating conditions, some variations in these ranges can be expected. These ranges are given to better teach those skilled in the art how to practice the present invention, and no unreasonable limitations on the scope of this invention are to be implied therefrom or from other data herein presented.

TABLE VII

[English System]

| Element | Volt/mil [a] | | |
|---|---|---|---|
| | Activation | Downswitch | Upswitch |
| Cu: | | | |
| 0%-22% [b] | $1.48\times10^3$-40 | $3\times10^2$-34 | 8-4 |
| 22%-24% [c] | 40-0 | 34-10 | 4-3 |
| Ag: | | | |
| 0%-16% [b] | $1.48\times10^3$-$10^2$ | $3\times10^2$-25 | 8-1.1 |
| 16%-24% [c] | $10^2\times45$ | 25-12 | 1.4-1.2 |
| Au: 0%-5% [b] | $1.48\times10^3$-$5\times10^2$ | $3\times10^2$-$2\times10^2$ | 8-1.8 |

[a] Typically currents are in the milliampere range.
[b] This glass system is useful for non-polar symmetrical switching and sequentially polar switching.
[c] This glass system is useful for sequentially polar, non-symmetrical switching.

TABLE VII

[Metric System]

| Element | Volts/mm. [a] | | |
|---|---|---|---|
| | Activation | Downswitch | Upswitch |
| Cu: | | | |
| 0%-22% [b] | $5.92\times10^4$-$1.6\times10^2$ | $1.2\times10^4$-$1.36\times10^2$ | $3.2\times10^2$-$1.6\times10^2$. |
| 22%-24% [c] | $1.6\times10^2$-0 | $1.36\times10^2$-$4\times10^2$ | $1.6\times10^2$-$1.2\times10^2$. |
| Ag: | | | |
| 0%-16% [b] | $5.92\times10^4$-$4\times10^3$ | $1.2\times10^4$-$10^3$ | $3.2\times10^2$-56. |
| 16%-24% [c] | $4\times10^3$-$1.8\times10^2$ | $10^3$-$4.8\times10^2$ | 56-48. |
| Au: 0%-5% [b] | $5.92\times10^4$-$2\times10^4$ | $1.2\times10^4$-$8\times10^3$ | $3\times10^2$-72. |

[a] Typically currents are in the milliampere range.
[b] This glass system is useful for non-polar symmetrical switching and sequentially polar switching.
[c] This glass system is useful for sequentially polar, non-symmetrica switching.

By way of summary, as shown in Table V and as described in the associated accompanying disclosure, a device of this invention so far as is known is capable of existing in only one or two of three switching cycles responsive to the above indicated preselected electric fields applied thereto. The same switching device having once been placed in the sequentially polar symmetrical switching cycle characteristically can be placed in the non-polar symmetrical switching cycle by application of an appropriate preselected electric field. However, when a device is in the characteristic sequentially polar non-symmetrical switching cycle, it characteristically cannot be made to operate in the non-polar symmetrical switching cycle. When a device which uses a glass containing 6 to 22 atomic percent copper, 3 to 16 atomic percent silver, or 2.5 to 5 atomic percent gold (see Table V) is in the non-polar symmetrical switching cycle, it characteristically can only be made to operate in the characteristic sequentially polar symmetrical switching cycle. When a device which uses a glass containing from 0 to 6 atomic percent copper, 0 to 3 atomic percent silver, or 0 to 2.5 atomic percent gold (see Table V), it exhibits only the non-polar symmetrical switching cycle. When a device which uses a glass containing 22 to 24 atomic percent copper or 16 to 24 atomic percent silver (see Table V), it is found as activated to be in a characteristic sequentially polar non-symmetrical switching cycle from which it characteristically cannot be made to operate in the characteristic non-polar symmetrical switching cycle.

The embodiments of the invention in which an exclusive property or privilege is claimed are defined as follows:

1. A solid state switching device which, when semiconductive, is capable of one or two of three distinct switching cycles responsive to preselected electric fields applied thereto, one switching cycle being characteristically non-polar and symmetrical wherein switching occurs under applied voltage and current conditions, the other cycles being characteristically sequentially polar wherein switching occurs under both finite voltage and current conditions and also under nearly zero voltage and zero amperage conditions, said device comprising:

(a) a wafer of a glass composition as defined by area A of FIGURE 1 and as further modified by partial replacement of antimony with a material selected from the group consisting of from greater than 0 to about 24 atomic percent copper, from greater than 0 to about 24 atomic percent silver, and from greater than 0 to about 5 atomic percent gold but containing not less than about 15 atomic percent of antimony;

(b) two electrodes, each one functionally associated with a different surface region of said wafer;

(c) the relationship between said wafer and said pair of electrodes being such that (1) said wafer has a characteristic initial resistance state measured through said electrodes greater than said characteristic high resistance state; and (2) when a sufficient minimum electric field is applied to said wafer through said electrodes, said wafer becomes semiconductive as indicated by a change from said characteristic initial resistance state to said characteristic low resistance state.

2. A glass composition of the system antimony-sulfur-iodine as defined by the shaded area A in the ternary diagram of FIGURE 1 and wherein the antimony is replaced by at least one of the elements of the group consisting of from greater than 0 to about 24 atomic percent of copper, from greater than 0 to about 24 atomic percent of silver and from greater than 0 to about 5 atomic percent of gold, there being in such composition not less than about 15 atomic percent of antimony.

3. In a method for switching an activated device of claim 1 in its sequentially polar symmetrical characteristic low resistance state, the steps of (a) applying a first electric field across said device sufficient to cause same to switch to its intermediate resistance state, and (b) reducing said first electric field to zero and applying second electric field of opposite polarity from said first electric field sufficient to cause such device to switch to its characteristic low resistance state.

4. In a method for switching an activated device of claim 1 in its sequentially polar non-symmetrical characteristic low resistance state, said device having been activated by applying an initial electric field across said device having a polarity and value sufficient to cause same to switch from its characteristic initial high resistance state to said characteristic low resistance state, the steps of (a) applying a first electric field across said device sufficient to cause same to switch to its intermediate resistance state, said first electric field having the same polarity as said initial electric field used to activate such device, (b) reducing said first electric field to zero and applying a second electric field of opposite polarity from said first electric field sufficient to cause such device to switch to its characteristic low resistance state.

5. In a method for switching an activated device of claim 1 in its sequentially polar symmetrical characteristic intermediate resistance state to its symmetrical high resistance state, said device having been activated by applying an initial electric field across said device having a polarity and value sufficient to cause same to switch from its characteristic initial high resistance state to its characteristic low resistance state, the step of applying an electric field across said device sufficient to cause same to switch from its intermediate resistance state to its symmetrical high resistance state, said electric field having a polarity the same as that of said initial electric field used to activate said device.

6. In a method for switching an activated device of claim 1 in its sequentially polar non-symmetrical characteristic low resistance state, the steps of (a) applying across said device a first electric field having a polarity opposite from that to be subsequently used for effecting switching, and then (b) applying across said device a second electric field having a polarity and magnitude proportional to said first electric field sufficient to switch said device to its characteristic intermediate resistance state.

7. A solid state semiconductive switching device which, when semiconductive, is capable of a sequentially polar symmetrical switching cycle responsive to preselected electric fields applied thereto, said device comprising a glass body and a pair of electrode means, each one functionally associated with a different region of said body, said glass body comprising means responsive to first voltage signals of appropriate polarity and value for changing the resistance state of said body from a first discrete high resistance state to a second discrete low resistance state, said means being further thereafter responsive to second voltage signals of the same polarity and of substantially smaller value compared to said first voltage signals for changing the resistance state of said body from said second discrete low resistance state to a high resistance state which is substantially identical to said first discrete high resistance state, and said means being still further thereafter responsive to third voltage signals of a polarity opposite to that of said first voltage signals and having a value about like that of said first voltage signals for changing the resistance state of said body from such high discrete resistance state to said second discrete low resistance state.

8. The device of claim 7 wherein said glass body consists of a glass composition of the system antimony-sulfur-iodine as defined by the shaded area A in the ternary diagram of FIGURE 1 which is modified by partial replacement of antimony with an amount of copper ranging from about 6 to 22 atomic percent but which contains not less than about 15 atomic percent of antimony.

9. The device of claim 7 wherein said glass body consists of a glass composition of the system antimony-sulfur-iodine as defined by the shaded area A in the ternary diagram of FIGURE 1 which is modified by partial replacement of antimony with an amount of silver ranging from about 3 to 16 atomic percent but which contains not less than about 15 atomic percent of antimony.

10. The device of claim 7 wherein said glass body consists of a glass composition of the system antimony-sulfur-iodine as defined by the shaded area A in the ternary diagram of FIGURE 1 which is modified by partial replacement of antimony with an amount of gold ranging from about 2.5 to 5 atomic percent but which contains not less than about 15 atomic percent of antimony.

11. A solid state semiconductive switching device which, when semiconductive, is capable of a sequentially polar non-symmetrical switching cycle responsive to preselected electric fields applied thereto, said device comprising a glass body and a pair of electrode means, each one functionally associated with a different region of said body, said glass body comprising means responsive to first voltage signals of appropriate polarity and value for changing the resistance state of said body from a first discrete high resistance state to a second discrete low resistance state, said means being further thereafter responsive to second voltage signals of a substantially smaller value and of a polarity opposite to that of said first voltage signals for changing the resistance state of said body from said second discrete low resistance state to said first discrete high resistance state, and said means being still further thereafter responsive to third voltage signals of a polarity the same as that of said first voltage signals and having a value about like that of said first voltage signals for changing the resistance state of said body from said first discrete high resistance state to said second discrete low resistance state.

12. The device of claim 11 wherein said glass body consists of a glass composition of the system antimony-sulfur-iodine as defined by the shaded area A in the ternary diagram of FIGURE 1 which is modified by partial replacement of antimony with an amount of copper ranging from about 22 to 24 atomic percent but which contains not less than about 15 atomic percent of antimony.

13. The device of claim 11 wherein said glass body consists of a glass composition of the system antimony-sulfur-iodine as defined by the shaded area A in the ternary diagram of FIGURE 1 which is modified by partial replacement of antimony with an amount of silver ranging from about 16 to about 24 atomic percent but which contains not less than about 15 atomic percent of antimony.

14. The method of claim 4 including the additional step of increasing the intensity of said second electric field until a maximum field energy is reached until breakdown occurs and the device becomes inoperable.

15. The method of claim 4 including the additional step of reducing said second electric field to zero after said device has switched to its characteristic low resistance state and before breakdown is reached and then applying said first electric field across said device until such device switches to its characteristic intermediate resistance state.

References Cited by the Examiner

UNITED STATES PATENTS

| | | | |
|---|---|---|---|
| 3,024,119 | 3/1962 | Flaschen et al. | 106—47 |
| 3,117,013 | 1/1964 | Northover et al. | 106—47 |
| 3,154,503 | 10/1964 | Janakirama-Rao et al. | 252—515 |
| 3,177,082 | 4/1965 | MacAvoy | 106—47 |
| 3,232,886 | 2/1966 | Hoffman | 252—514 |
| 3,241,009 | 3/1966 | Dewald et al. | 106—47 |
| 3,249,469 | 5/1966 | Stegherr | 252—514 |
| 3,258,434 | 6/1966 | Mackenzie et al. | 106—47 |

ANTHONY BARTIS, *Primary Examiner.*

RICHARD M. WOOD, W. D. BROOKS, *Assistant Examiners.*

UNITED STATES PATENT OFFICE
CERTIFICATE OF CORRECTION

Patent No. 3,312,922 April 4, 1967

William R. Eubank et al.

It is hereby certified that error appears in the above numbered patent requiring correction and that the said Letters Patent should read as corrected below.

Columns 5 and 6, TABLE III, last column, line 3 thereof, for "$2.2\times10^9-4\times10^2$" read -- $2.2\times10^9-4\times10^7$ --; column 6, line 65, for "about" read -- (about --; column 7, line 6, for "One" read -- Once --; line 10, for "fail" read -- fall --; column 11 line 6, for "conentrations" read -- concentrations --; column 12, line 74, for "non-symmetrica" read -- non-symmetrical --.

Signed and sealed this 21st day of November 1967.

(SEAL)
Attest:

Edward M. Fletcher, Jr.
Attesting Officer

EDWARD J. BRENNER
Commissioner of Patents